United States Patent [19]

Aoyama et al.

[11] Patent Number: 4,703,734
[45] Date of Patent: Nov. 3, 1987

[54] MULTI-VALVE INTERNAL COMBUSTION ENGINE

[75] Inventors: Shunichi Aoyama, Yokosuka; Hiroshi Fujii; Manabu Kato, both of Tokyo, all of Japan

[73] Assignee: Nissan Motor Co., Ltd., Yokohama, Japan

[21] Appl. No.: 836,415

[22] Filed: Mar. 5, 1986

[30] Foreign Application Priority Data

Mar. 6, 1985 [JP] Japan .................................. 60-42704
Mar. 26, 1985 [JP] Japan .................................. 60-59472

[51] Int. Cl.⁴ ............................................. F02B 15/00
[52] U.S. Cl. .................................. 123/432; 123/90.15
[58] Field of Search ...................... 123/432, 308, 90.15

[56] References Cited

U.S. PATENT DOCUMENTS 4,317,438  3/1982  Yagi et al. ............................ 123/432
4,532,902  8/1985  Mizuno et al. ....................... 123/308

FOREIGN PATENT DOCUMENTS 47-31724   8/1972  Japan .
90720      5/1984  Japan .................................. 123/432
200028    11/1984  Japan .................................. 123/432
516605     1/1940  United Kingdom ............... 123/432
1177260    1/1970  United Kingdom ............... 123/432
1254315   11/1971  United Kingdom ............... 123/432
1576876   10/1980  United Kingdom ............... 123/432
2087975    6/1982  United Kingdom ............... 123/432

Primary Examiner—E. Rollins Cross
Attorney, Agent, or Firm—Schwartz, Jeffery, Schwaab, Mack, Blumenthal & Evans

[57] ABSTRACT

In order to improve air-fuel mixture uniformity and enhance charging efficiency during high engine speed operation and to obviate noise produced as hot exhaust gases flow at sonic velocity back into the induction system and the formation of carbon deposits which can induce valve "stick", the inlet valve which controls the induction passage utilized during low engine speed operation is opened before the one which controls the induction passage which is rendered effective during high speed, and with an overlap with the exhaust valve.

16 Claims, 12 Drawing Figures

MULTI-VALVE INTERNAL COMBUSTION ENGINE

BACKGROUND OF THE PRESENT INVENTION

1. Field of the Invention

The present invention relates generally to an internal combustion engine induction system and more specifically to an induction system which uses multiple inlet valves per combustion chamber.

2. Description of the Prior Art

FIGS. 1 to 4 of the drawings show the construction and operational characteristics of the arrangement disclosed in in Japanese Patent Application First Provisional Publication No. 47-31724. In the induction system disclosed in this document each cylinder is provided with what shall be termed "a low speed" induction passage 1 and valve 2 which are arranged to introduce the incomming charge into the combustion chamber 4 in a manner that it swirls about the axis "A" of the cylinder and thus the combustion chamber. Viz., passage 1 is arranged to introduce the incoming charge into the combustion chamber with a flow vector which is essentially tangential with respect to the cylinder axis and which, as seen in FIG. 1, is arranged with respect to the axis as to maximize the flow component in a plane which is normal to the cylinder axis.

The system further includes what shall be referred to as a second "high speed" passage 6 for each cylinder. This passage is arranged to deliver the charge at a steeper angle into the the combustion chamber 4 and in manner which promotes charging efficiency rather than swirl therein. An inlet valve 7 controls communication between the combustion chamber 4 and the induction passage 6. The swirls produced by the two passages 1,6 tend to interfere with one another and thus suppress the formation of an excessively strong swirl under high engine speed operation.

A butterfly valve 8 is disposed in the high speed induction passage 6 and arranged to be closed at low engine speeds. The valve blade is supported on an axis 10.

The cam arrangement which controls the lifting of the exhaust and inlet valves is arranged to produced the lift characteristics shown in FIG. 3. Accordingly, with this arrangement as the induction volume under such low RPM modes of engine operation (e.g. idling) is low, the butterfly valve 8 is closed, the entire charge is forced to pass through the low speed passage 1 and thus enter the combustion chamber 4 at a velocity which generates a strong swirl therein which promotes stable combustion. As the butterfly valve 8 is closed the induction occurs as if the high speed inlet valve 7 were disabled and thus the induction characteristics are therefore controlled exclusively by the lift timing of inlet valve 2.

On the other hand, when the butterfly valve 8 is opened, as the lift of the "high speed" inlet valve 7 begins before that of the "low speed" one (2) the induction characteristics are controlled primarily by the timing of valve 7.

As shown in FIG. 2 this induction system includes a single exhaust passage 12 and valve 13. The lift timing of the high speed inlet valve 7 is selected in conjunction with the timing of the exhaust valve 13 to provide an overlap which promotes good engine respiration characteristics at high engine speed.

However, this arrangement has encountered the drawbacks that when the inlet and exhaust valves are lifted in the manner shown in FIG. 3, when the butterfly valve 6 is switched to its open position to permit induction to occur through both the high and low speed passages 1,6 as the lift timing of the high speed inlet valve 7 occurs before the low speed one the induction characteristics are as shown in FIG. 4 occur. Viz., the amount of charge inducted via the high speed passage 6 and the amount inducted through the low speed passage 1 are as shown in broken and solid line traces respectively. As will be noted most of the induction takes place through via the "high speed" passage. However, as the fuel is injected into the "slow speed" passage 1, due to the relatively small volume of air which is inducted therethrough the fuel tends to become insufficiently carburetted and leads to unstable combustion.

On the other hand, when the engine is operating under low speed conditions, the butterfly valve 8 is closed and the engine throttle valve 16 is only partially opened a realatively high vacuum in the order of 400 mmHg, develops in the induction manifold 17 downstream of the throttle valve 16 ( including the section downstream of the butterfly valve 18). It will be noted that this latter mentioned section of the induction system has a volume which corresponds to 15 to 20% of the combustion space (viz., the volume of the combustion chamber with the piston at TDC.

As the high speed inlet valve 7 opens before the slow one the pressure prevailing in the high speed induction passage 6 downstream of the butterfly valve 8 tends to vary as shown by the solid line trace in FIG. 6. Accordingly, just at the end of the exhaust phase of the engine when the high speed inlet valve is opened, a sudden flow of hot residual exhaust gas enters the high speed passage 6 at close to sonic velocity. This phenomenon apart from causing an undersirable high pitched whistling noise also causes the butterfly valve 8 to be subject to an undersirable impluse. Viz., as the butterfly valve in the cae of of a 1,800 cc engine (merely by way of example) has a surface area of from 6 to 8 $cm^2$, the valve tends to be subject to a sudden force of the order of 3 to 4 Kg. This of course tends to have a detremental effect on the valve particularly the shaft 10 thereof and in some cases actually bends the same. Moreover, as the gases are still very hot, carbon deposits tend to form therein in a manner which tends to invite the butterfly valve 8 to "stick".

The above problem is even more pronouced in the event that the valves of the engine are lifted with a timing such as shown in FIG. 7. It is of course possible that a variable valve timing arrangement be used to shift the timing from that shown in FIG. 3 to that shown in FIG. 7. However, as will be appreciated this variability does not alleviate any of the problems set forth above.

SUMMARY OF THE INVENTION

It is an object of the present invention to provide a multi-inlet valve internal combustion engine which features good air-fuel mixture uniformity and charging characteristics at high speed and which does not generate noise nor permit the soiling of the induction system in a manner which invites sticking of a flow control valve which "disables" one of the inlet valves during a low-intermediate speed mode of engine operation.

In brief, the above objects are acheived by opening the inlet valve which controls the induction passage utilized during low engine speed operation before that which controls the induction passage which is rendered effective during high speed and with an overlap with the exhaust valve.

More specifically, a first aspect of the present invention takes the form of an internal combustion engine which includes means defining a combustion chamber; an induction system leading to the combustion chamber; and an exhaust system leading from the combustion chamber, the exhaust system including an exhaust valve which controls communication between the combustion chamber and an exhaust passage; the induction system comprising: a first induction passage which communicates with the combustion chamber via a first inlet valve, the first inlet passage being arranged to introduce air into the combustion chamber in a manner which establishes a swirling air pattern in the combustion chamber; a second induction passage which communicates with the combustion chamber via a second inlet valve; a flow control valve disposed in the second induction passage, the valve having a first position wherein the second induction passage is closed and a second position wherein the second induction passage is open; means for controlling the flow control valve in response to an engine operational parameter; means for controlling the first inlet valve to open before the exhaust valve closes; and means for controlling the second inlet valve to open after the first valve opens.

A second aspect of the present invention comes in a method of operating an internal combustion engine, the engine including: means defining a combustion chamber; an induction system leading to the combustion chamber; and an exhaust system leading from the combustion chamber, the exhaust system including an exhaust valve which controls communication between the combustion chamber and an exhaust passage; the induction system including: a first induction passage which communicates with the combustion chamber via a first inlet valve, the first inlet passage being arranged to introduce air into the combustion chamber in a manner which establishes a swirling air pattern in the combustion chamber; a second induction passage which communicates with the combustion chamber via a second inlet valve; a flow control valve disposed in the second induction passage, the valve having a first position wherein the second induction passage is closed and a second position wherein the second induction passage is open; the method comprising the steps of: controlling the flow control valve in response to an engine operational parameter; controlling the the first inlet valve to open before the exhaust valve closes; and controlling the second inlet valve to open after the first valve opens.

BRIEF DESCRIPTION OF THE DRAWINGS

The features and arrangement of the present invention will become more clearly appreciated from the following description taken in conjunction with the accompanying drawings in which.

DETAILED DESCRIPTION OF THE PREFERRED EMBODIMENTS

The present invention is particularly useful in combination with supercharged engines. Accordingly, the engine to which the embodiments of the invention are applied is equipped with a turbo charger 100.

Figure 5:
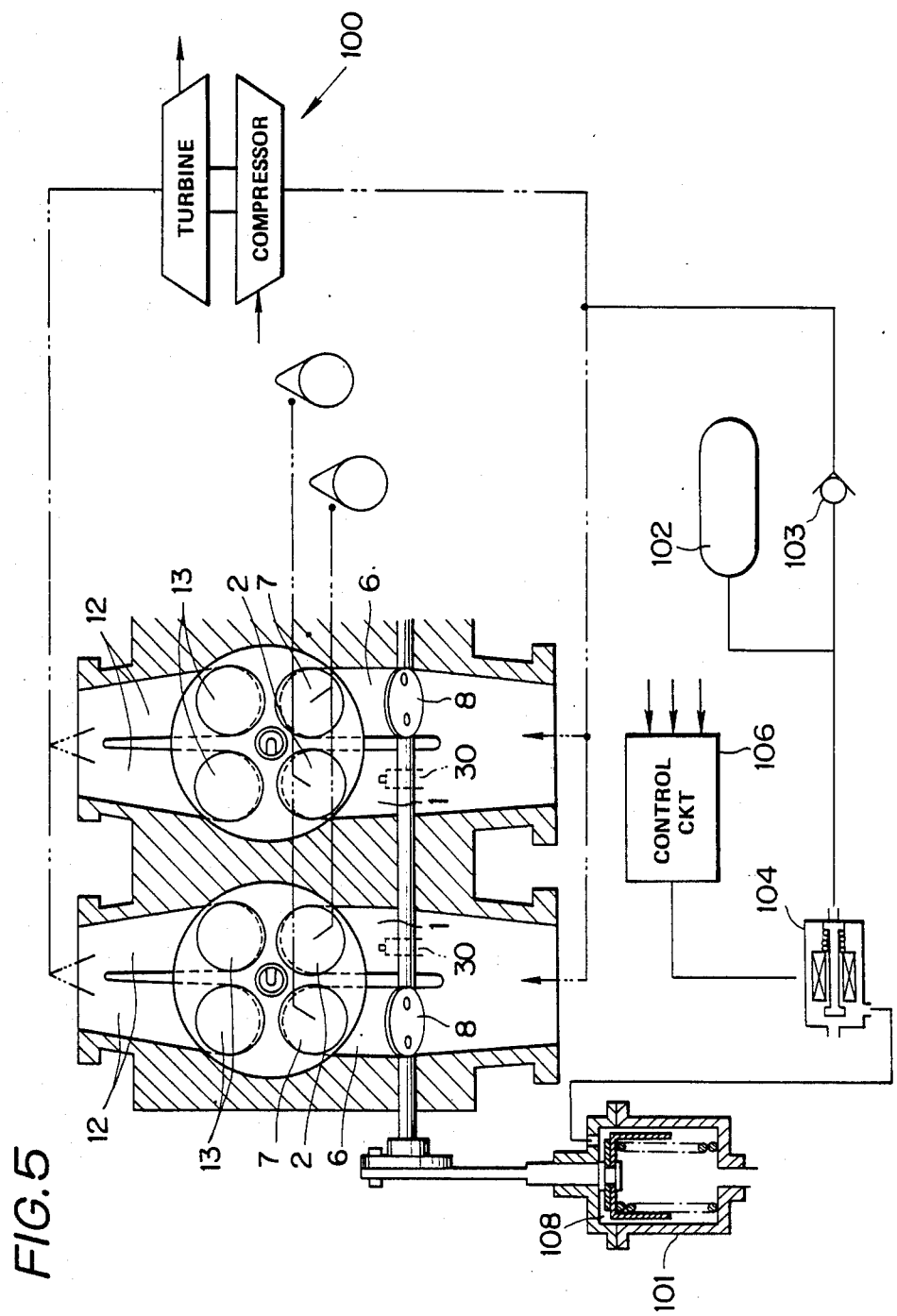
FIG. 5 is a sectional plan view of an engine system to which the embodiments of the present invention are applicable.
Figure 7:
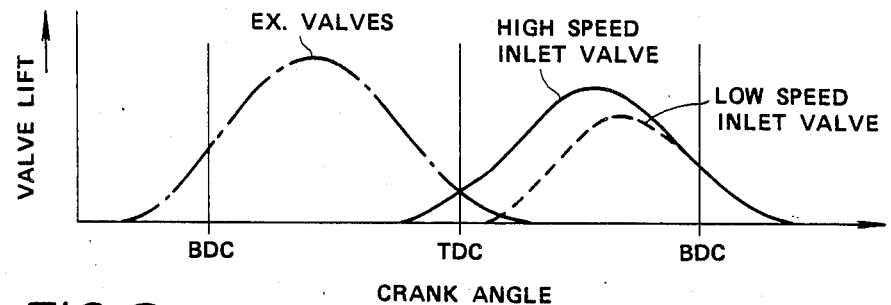
FIG. 7 is a valve lift/timing chart showing an alternative valve lift which is utilized in the FIG. 1 arrangement.

In the arrangement shown in FIG. 5 the butterfly valves 8 which at control the high speed passages are controlled by a pneumatic motor 101. This motor is operated on the turbocharger compressor output. To buffer the fluctuations in pressure a reservoir 102 is provided downstream of a one-way valve 103. The supply of pressure to the pneumatic motor 101 is controlled by a solenoid valve 104 which in turn is controlled by a control circuit 106. This circuit is responsive to one or more engine operational parameters such as engine speed, load etc., and selectively supplies pressure to the pressure chamber 108 of motor 101.

It is within the scope of the present invention to arrange for the butterfly valves 8 to be rapidly opened and closed in order to modulate the amount of air which passes through the high speed passages or simply switched from one position to another upon the threshold at which the high speed passage should be put into operation.

As the various modes of operation possible with such a valve will be apparent to those skilled in the art to which the present invention pertains.

Figure 11:
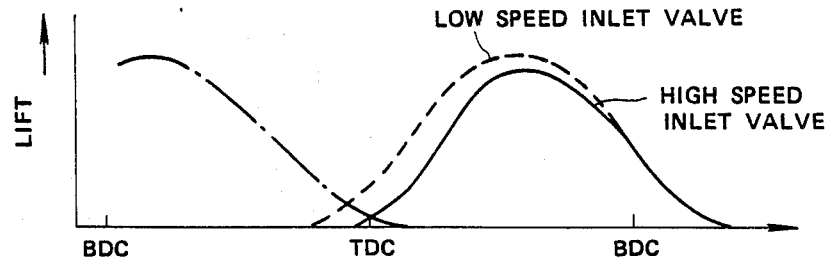
FIGS. 11 and 12 are sectional views showing the disposition of a fuel injector in engine to which the present invention is applied.
Figure 12:
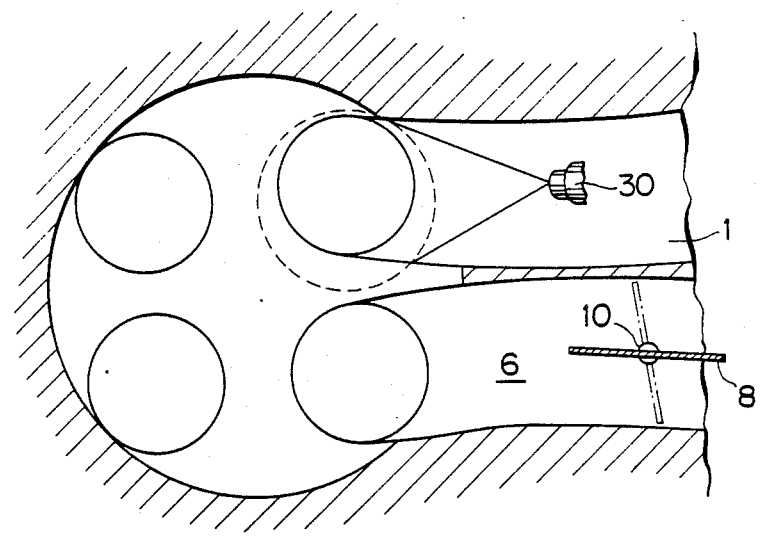

As will become apparent hereinlater, the instant invention finds advantageous application in fuel injected engines. In such engines it is deemed appropriate to arranged the fuel injectors 30 as shown in FIGS. 11 and 12.

Figure 8:
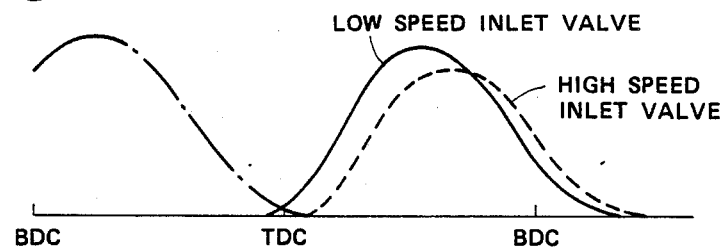
FIG. 8 is a chart showing the valve lift which characterize a first embodiment of the present invention.

FIG. 8 shows the valve timing which characterizes a first embodiment of the invention. As will be noted the timing of the valves is essentially the reverse of that of the prior art discussed hereinbefore. Viz., in this embodiment the valve 2 which controls the slow induction passage 1 is arranged to lift before and higher than that (7) which controls the high speed induction passage 6. The lift timing of valve 2 is arranged to begin before the closure of the exhaust valves 13 in a manner which defines a small valve overlap therewith. The valve 7 which controls the high speed port 6 is arranged to have little or no overlap with the exhaust valves 13 in this embodiment.

The overlap of valve 2 is preferably held within a range of 10-25 degree of crankshaft rotation. The reason for this is that with tubocharged engines the valve overlap is generally maintained on the small side due to the fact that during low to intermediate engine speed operation the induction pressure (supercharged) is higher than the exhaust back pressure and thus, if the valve overlap is overly large, an undesirably large amount of fresh charge passes into the exhaust system; while during high engine speed operation the exhaust back pressure becomes greater than the induction pressure and exhaust gases tend to backflow into the induction system deteriorating the charging efficiency of the engine.

Figure 10:
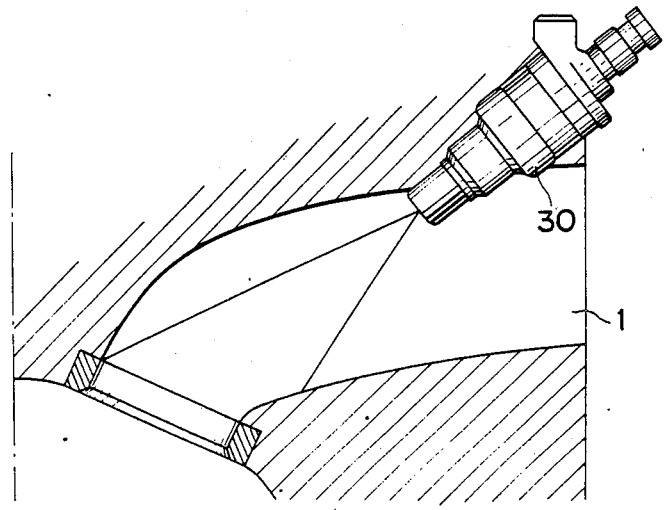
FIG. 10 is a chart similar to that shown in FIG. 8 but which shows the valve lift which characterizes a second embodiment of the present invention.

FIG. 10 shows the valve timing according to a second embodiment of the present invention. It will be noted that in this embodiment both of valves 2, 7 have lift timing which overlaps the timing of the exhaust valves 13. It will be also noted that although in both of the embodiments the lift characteristics of the exhaust valves 13 are shown to be the same, the present invention is not limited and that the timing of the exhaust valves may be varied if so desired without departing from the scope of the invention. It will be further noted that in the second embodiment the closure of the inlet valves occurs at essentially the same timing. However, this may be varied as deemed appropriate.

With the embodiments of the present invention is has been found that even if the inlet/exhaust valve overlap is greater than that mentioned above the amount of exhaust gas which flows back into the induction system under high speed operation does not deviate substantially from the prior art arrangement while at low engine speeds charging efficiency is adequately maintained.

With the embodiments of the present invention, when the engine is operating at low engine speeds such as idling, a relatively high vacuum tends to develop in the induction system downstream of the throttle valve. Accordingly, upon opening of the slow speed inlet valve 2 a relatively large volume of hot exhaust gases tends momentarily backflow into the slow speed passage 1. However, by injecting fuel at this time evaporation and mixing of the fuel tends to be promoted while simultaneously the formation of carbon deposits is attenuated. Following this, as the fresh charge flows into the combustion chamber the air-fuel mixture formed during the above mentioned backflow is carried into the combustion chamber and a strong swirl is produced. The combination of these factors of course promote stable combustion.

Figure 9:
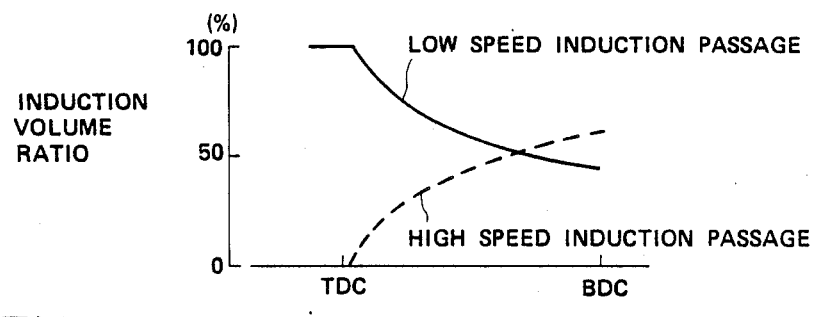
FIG. 9 is a graph which shows in terms of induction volume and crank angle, the amount of air or air-fuel charge which is inducted via each of the respective ports of the engine.

As shown in FIG. 9, with the invention the proportion of charge which is inducted through the slow induction passage 1 during the first half of the induction phase is increased as compared with the prior art. Accordingly, the amount of air with which the fuel is initially mixed is increased promoting good carburetion and further increases the amount of air which enters the combustion chamber during low speed operation thus promoting an increase in compression ratio and charging efficiency.

Figure 1:
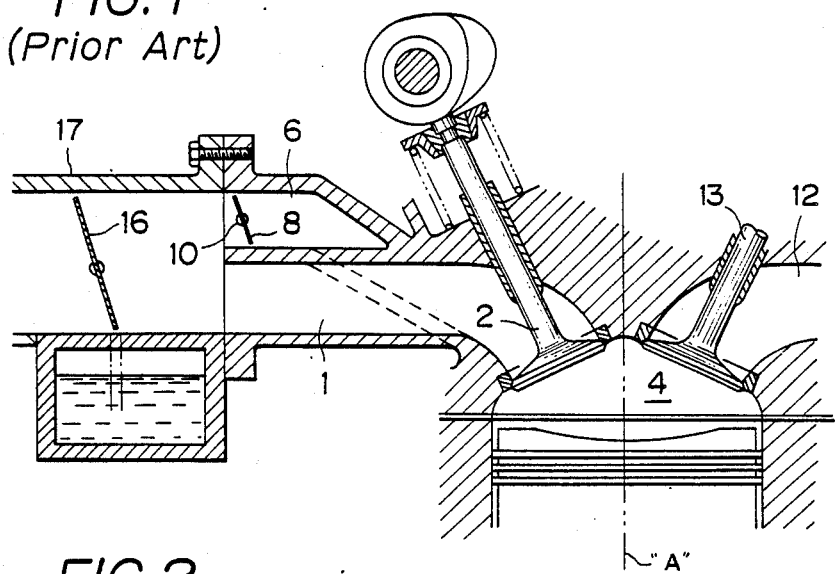
FIG. 1 is a section elevation of the prior art arrangement discussed in the opening paragraphs of the instant disclosure.
Figure 2:
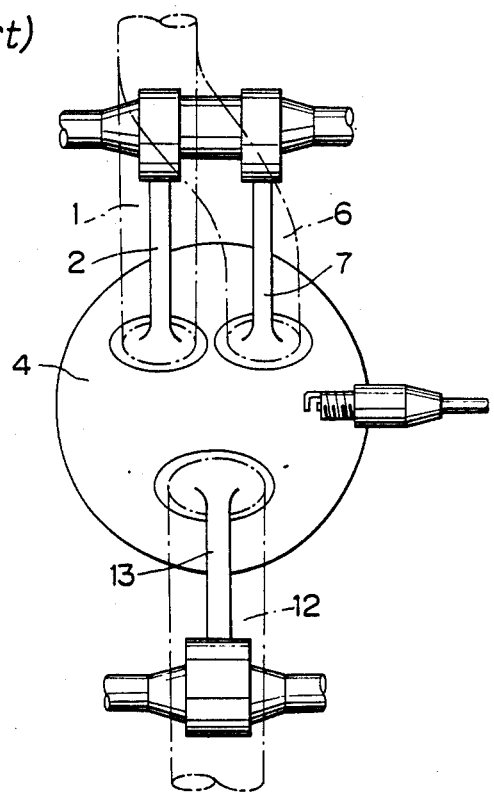
FIG. 2 is a schematic plan view of the arrangement shown in FIG. 1.
Figure 3:
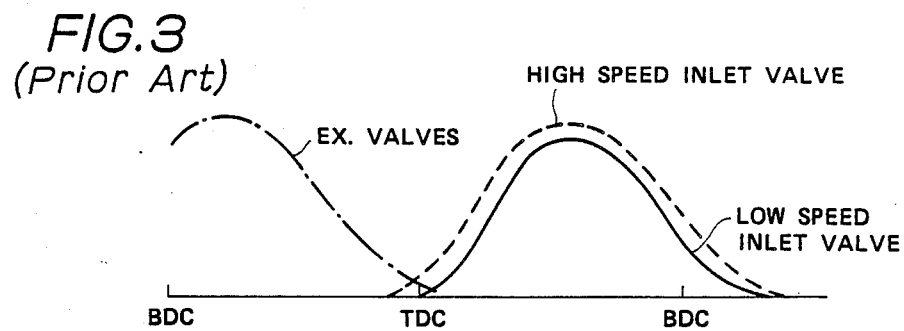
FIG. 3 is a chart showing the valve lift characteristics of the FIG. 1 arrangement.
Figure 4:
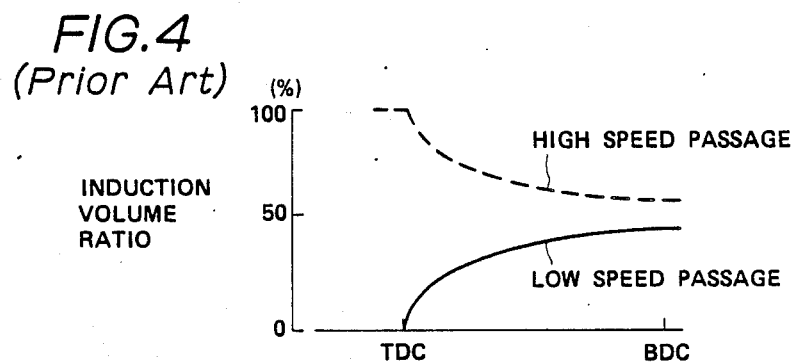
FIG. 4 is a graph which shows in terms of induction volume and crank angle, the amount of air (or air-fuel mixture) which is inducted through the respective induction passages of the FIG. 1 arrangement.
Figure 6:
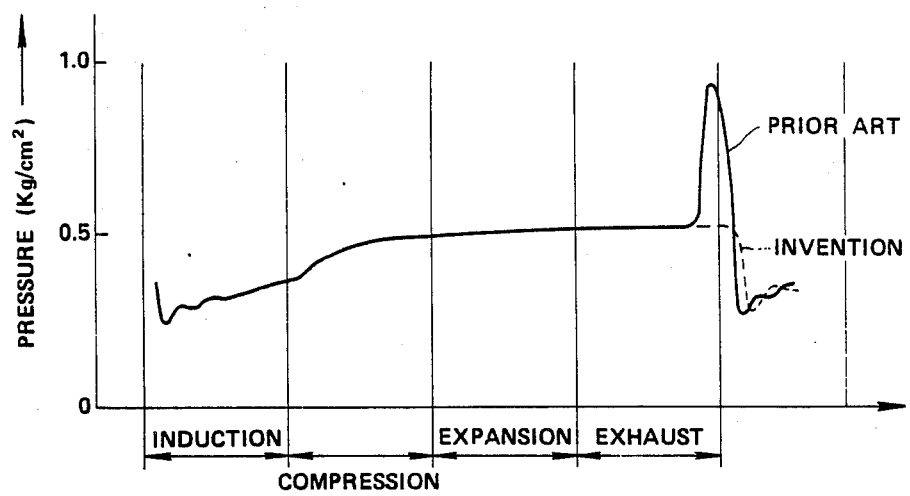
FIG. 6 is a graph showing in terms of induction pressure and engine phase, the pressure development which occurs with the FIG. 1 arrangement and a first embodiment of the present invention.

Further, under these conditions as the pressure in the combustion chamber has assumed essentially the same level as that prevailing in the induction system when the high speed valve 7 opens, the pressure in the high speed passage 6 downstream of the butterfly valve 8 varies as shown in broken line in FIG. 6. Hence, the noise generation and associated problems encountered with the prior art are eliminated.

During intermediate to high speed operation the butterfly valve 8 is opened and induction permitted through both the high and low speed passages 1, 6. This reduces the flow resistance of the induction system and promotes charging efficiency. At this time it is possible to shift the injection timing from the initial stage of induction toward an intermediate stage. If desired it is also possible to use a variable valve timing arrangement to advance the lift timing of the high speed inlet valve toward that of the slow speed inlet valve and thus further improve the charging characteristics of the engine.

As the amount of air which is inducted through the slow induction passage during the first half of the induction phase is greater than with the prior art arrangement, with the embodiments of the invention the amount of air with which the injected fuel is initially mixed is increased and this provides a notable improvement in air-fuel mixture uniformity during both low and high speed operation.

With the invention the valve timing is such as to maintain the generation of swirl within the combustion chamber up until intermediate engine speed operation. Depending on the control of the butterfly valve 8 the strength of the swirl can be modified.

Upon fully opening valve 8 the unrestricted flow through the high speed passage attenuates the swirl and simultaneously promotes further blending of the air-mixture within the combustion chamber prior ignition. This tends to unify the air-fuel ratio of the air-fuel mixture and attenuate engine knocking.

The closure timing of the inlet valves 2, 7 with the first embodiment is such that both valves close after BDC of the compression phase and that the slow speed inlet valve 1 closes prior the high speed one (7). This reduces the effective compression ratio of the engine in a manner which suppress the tendancy for the engine to knock and additionally takes advantage of the inertia ramming effect possible under such circumstances to improve charging efficiency.

What is claimed is:

1. In an internal combustion engine
means defining a combustion chamber;
an induction system leading to said combustion chamber; and
an exhaust system leading from said combustion chamber, said exhaust system including an exhaust valve which controls communication between said combustion chamber and an exhaust passage;
said induction system comprising:
a first induction passage which communicates with said combustion chamber via a first inlet valve, said first inlet passage being arranged to introduce air into said combustion chamber in a manner which establishes a swirling air pattern in said combustion chamber;
a second induction passage which communicates with said combustion chamber via a second inlet valve;
a flow control valve disposed in said second induction passage, said valve having a first position wherein said second induction passage is closed and a second position wherein said second induction passage is open;

means for controlling said flow control valve in response to an engine operational parameter;

means for controlling said first inlet valve to open before said exhaust valve closes; and means for controlling said second inlet valve to open after said first valve opens.

2. An internal combustion engine as claimed in claim 1, further comprising means for forming a combustible air-fuel mixture in said first induction passage.

3. An internal combustion engine as claimed in claim 2, wherein said combustible air-fuel mixture forming means takes the form of a fuel injector, said fuel injector being arranged to inject fuel into said first passage during the first half of the induction phase of said engine.

4. An internal combustion engine as claimed in claim 1, wherein said first inlet valve control means closes said first valve before said second inlet valve control means closes said second inlet valve.

5. An internal combustion engine as claimed in claim 1, wherein said first inlet valve control means closes said first inlet valve at essentially the same time as said second inlet valve control means closes said second inlet valve.

6. An internal combustion engine as claimed in claim 1, wherein said first inlet valve control means closes said first inlet valve after the termination of the induction phase of said engine.

7. An internal combustion engine as claimed in claim 1, wherein said second inlet valve control means closes said second inlet valve after the termination of the induction phase of said engine.

8. An internal combustion engine as claimed in claim 1, further comprising a fuel injector, said fuel injector being disposed in said first induction passage and arranged to inject fuel into said first passage toward said first inlet valve during the first half of the induction phase of the engine.

9. An internal combustion engine as claimed in claim 1, further comprising a supercharger, said supercharger supplying air under pressure to said first and second induction passages.

10. A method of operating an internal combustion engine, said engine including:

means defining a combustion chamber;

an induction system leading to said combustion chamber; and an exhaust system leading from said combustion chamber, said exhaust system including an exhaust valve which controls communication between said combustion chamber and an exhaust passage;

said induction system including:

a first induction passage which communicates with said combustion chamber via a first inlet valve, said first inlet passage being arranged to introduce air into said combustion chamber in a manner which establishes a swirling air pattern in said combustion chamber;

a second induction passage which communicates with said combustion chamber via a second inlet valve;

a flow control valve disposed in said second induction passage, said valve having a first position wherein said second induction passage is closed and a second position wherein said second induction passage is open;

said method comprising the steps of:

controlling said flow control valve in response to an engine operational parameter;

controlling said first inlet valve to open before said exhaust valve closes; and controlling said second inlet valve to open after said first valve opens.

11. A method as claimed in claim 10, further comprising the step of closing said first and second inlet valves after the termination of the induction phase of the engine.

12. A method as claimed in claim 10, further comprising the step of injecting fuel into said first induction passage during the first half of the induction phase of the engine.

13. A method as claimed in claim 10, further comprising the step of supplying said first and second induction passages with supercharging air under pressure.

14. An internal combustion engine as claimed in claim 1, wherein said flow control valve controlling means comprises:

a pneumatic servo which is operatively connected with said flow control valve;

a source of pneumatic pressure;

an electromagnetic valve; and a control circuit, said control circuit being responsive to a plurality of engine operational parameters, said control circuit being arranged to selectively energize said electromagnetic valve in a manner to selectively control the supply of pneumatic pressure to said servo.

15. An internal combustion engine as claimed in claim 14, wherein:

said engine includes a supercharging device having a compressor; and wherein:

said source of pneumatic pressure comprises:

a reservoir fluidly communicated with the compressor of said supercharging device; and a one-way valve fluidly interposed between said compressor and said reservoir, said one-way valve preventing the backflow of pressure from said reservoir to said compressor.

16. A method of operating an internal combustion engine comprising the steps of:

supplying air to a combustion chamber through first and second induction passages during a first high load mode of engine operation;

controlling the communication between the combustion chamber and said first and second induction passages using first and second inlet valves respectively;

closing said second induction passage during a second low load mode of engine operation using a valve disposed therein;

opening said first inlet valve before said second inlet valve;

using the sub-atmospheric pressure which prevails in said first induction passage during said second mode of engine operation to cause a fraction of the hot exhaust gas in the combustion chamber to backflow into said first induction passage during the initial stage of the induction phase of the engine;

injecting fuel into said first induction passage during the first half of the induction phase of the engine at a location proximate said first inlet valve;

mixing the fuel injected into said first induction passage with the hot exhaust gases in a manner which promotes evaporation of the fuel;

re-inducting the mixture of hot exhaust gases and injected fuel into the combustion chamber following the step of mixing; and inducing a swirl within the combustion chamber using the air which flows through said first induction passage while said first inlet valve is open.

* * * * *